United States Patent
Mai et al.

(10) Patent No.: US 8,917,847 B2
(45) Date of Patent: Dec. 23, 2014

(54) MONITORING AND NOTIFICATION MECHANISM FOR PARTICIPANTS IN A BREAKOUT SESSION IN AN ONLINE MEETING

(75) Inventors: Lan Betty Ngoc Mai, Seattle, WA (US); Joshua Pacheco Rose, Seattle, WA (US); Alan Darryl Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 90 days.

(21) Appl. No.: 13/494,578

(22) Filed: Jun. 12, 2012

(65) Prior Publication Data

US 2013/0329866 A1 Dec. 12, 2013

(51) Int. Cl.
*H04M 3/42* (2006.01)

(52) U.S. Cl.
USPC ............. 379/202.01; 379/88.02; 709/204; 704/251

(58) Field of Classification Search
USPC ............ 379/202.01, 88.02; 709/204; 704/251
See application file for complete search history.

(56) References Cited

U.S. PATENT DOCUMENTS

| | | | |
|---|---|---|---|
| 2004/0184586 A1* | 9/2004 | Coles et al. | 379/88.14 |
| 2008/0226049 A1* | 9/2008 | Kumar et al. | 379/202.01 |
| 2011/0268263 A1 | 11/2011 | Jones et al. | |
| 2011/0271332 A1* | 11/2011 | Jones et al. | 726/7 |
| 2012/0033796 A1* | 2/2012 | Gilbert et al. | 379/202.01 |

OTHER PUBLICATIONS

Cisco Systems, Inc. "Conferencing Scenarios" Sep. 6, 2005 RFC 4597.

* cited by examiner

*Primary Examiner* — Fan Tsang
*Assistant Examiner* — Simon King
(74) *Attorney, Agent, or Firm* — Tucker Ellis LLP

(57) ABSTRACT

In an example embodiment, a method for monitoring a conference call and notifying members of a breakout session to return to the conference call. The method comprises mixing input streams received from participants of a conference call and distributing mixed streams to the participants, a first stream is provided to participants attending the breakout session and a second stream is provided to remaining participants of the conference call. Speech from the second stream is converted to text and the text is searched for predefined keywords. An alert is sent to at least one participant in the breakout session responsive to detecting one of the predefined keywords.

21 Claims, 6 Drawing Sheets

US 8,917,847 B2

MONITORING AND NOTIFICATION MECHANISM FOR PARTICIPANTS IN A BREAKOUT SESSION IN AN ONLINE MEETING

TECHNICAL FIELD

The present disclosure generally relates to conferencing.

BACKGROUND

Online conferencing allows participants to meet from geographically disperse locations. A handy feature of online meetings allows participants to break out into sub-groups for a collaborative side discussion in a virtual meeting room. The conversation in the virtual meeting room is limited to the members of the sub-group and is not distributed to other meeting participants that are not members of the sub-group.

OVERVIEW OF EXAMPLE EMBODIMENTS

Figure 1:
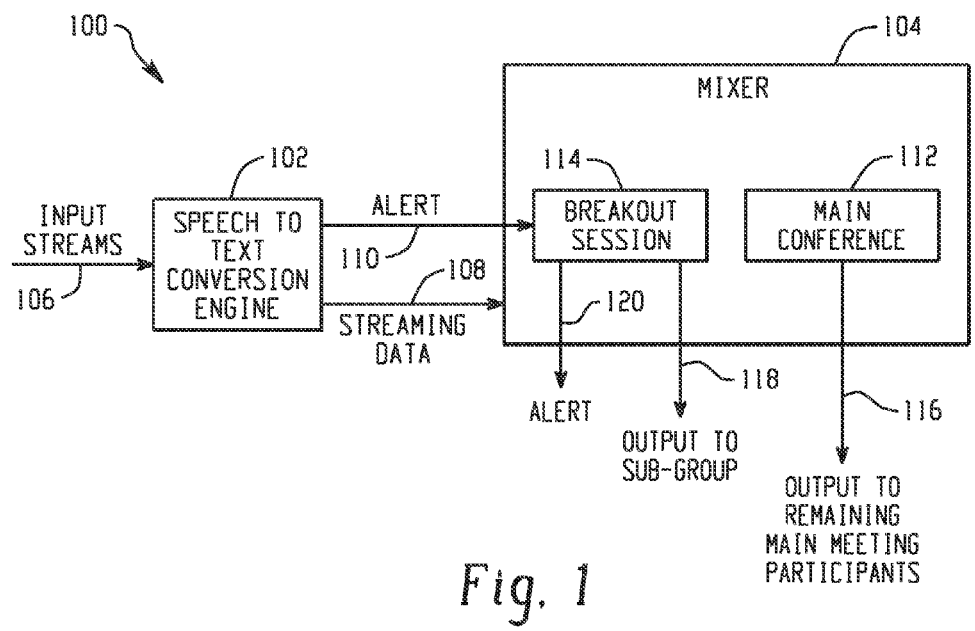
FIG. 1 is a block diagram of a conferencing system that employs a speech to text converter in series with a mixer.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Described in an example embodiment herein is a method for monitoring a conference call and notifying members of a breakout session to return to the conference call. The method comprises mixing input streams received from participants of a conference call and distributing mixed streams to the participants, a first stream is provided to participants attending the breakout session and a second stream is provided to remaining participants of the conference call. Speech from the second stream is converted to text and the text is searched for predefined keywords. An alert is sent to at least one participant in the breakout session responsive to detecting one of the predefined keywords.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is described herein a conferencing system where a sub-group of meeting participants can leave the main meeting and have a breakout (sidebar) session while the main meeting continues. In an example embodiment, the main meeting continues, however, the audio/video of the main meeting moves to the background (e.g., plays at a lower volume) for the sub-group. In another example embodiment, the sub-group is isolated from the main meeting, e.g., the video and/or audio from the main meeting is muted.

In an example embodiment, a member of the sub-group, such as the host or participant initiating the breakout session and/or the host of the main meeting, may configure the system to alert a member or members of the sub-group to return to the main meeting upon detecting certain predefined keywords. As used herein, a keyword may be single word or may also be a plurality of words such as a phrase. In particular embodiments, keywords may include the names of the meeting participants attending the breakout session and/or groups affiliated with a meeting participant (e.g., the participant's department such as marketing). For example, the system can be configured to alert members of a sub-group if the host of the main meeting states "alright everyone, let's re-convene." In an example embodiment, speech recognition technology is employed to detect when keywords or phrases are spoken in the main meeting. A signal can be communicated to members of the sub-group (for example, the video of a sidebar session can flicker or flash red in the background when key words in the main session are detected).

In other embodiments, less obtrusive notification mechanisms could also be used. For example, the audio from the main conference could be piped through the speech recognition engine before it is played out to the sidebar participants. The volume level would be amplified just for the configured key words spoken in the main conference. Although there would be a slight delay in the main conference audio stream due to the speech recognition processing, the end result is that each word's audio volume could be adjusted depending on whether the word was a key word. Most of the main meeting audio would be played at a relatively low volume but then when someone in the main meeting says a keyword or phrase, such as "let's re-convene," those words would be amplified for the sidebar listeners since they are configured key words. Sidebar participants names could automatically be included in the key word list. Any time a participant name is mentioned in the main conference audio stream it would be amplified in the sidebar audio. For example, if someone in the main conference says "gee I don't know, let's ask ALAN GATZKE,"

and ALAN GATZKE is a participant in the sidebar, "ALAN GATZKE" would be amplified for the sidebar participants audio since ALAN GATZKE is a participant in the sidebar discussion. In particular embodiments, the particpants' first names or surnames may also be listed as keywords. For example, for meeting participant Alan Gatzke, "ALAN," "GATZKE," and "ALAN GATZKE" can all be keywords.

FIG. 1 is a block diagram of a conferencing system 100 that employs a speech to text converter 102 in series with a mixer 104. The speech to text converter 102 and mixer 104 may suitably comprise logic for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In example embodiments, input streams 106 from the meeting participants (not shown) are received by speech to text converter 102. The speech to text converter 102 provides streaming data 108 to mixer 104. In the illustrated example, mixer 104 comprises a main conference mixer 112 for mixing signals and provides an output 116 that is provided to the main meeting and a breakout session mixer 114 for mixing signals and provides a signal 118 that is provided to participants of the breakout session.

If the speech to text converter 102 detects that a meeting participant uttered a predefined keyword in an input stream, the speech to text converter 102 generates an alert 110. In particular embodiments, the speech to text converter 102 searches input streams from participants in the main conference meeting for keywords. In an example embodiment, the alert 110 is provided to the breakout session mixer 114. Breakout session mixer 114 transmits an alert 120 to the appropriate participants of the breakout session. In the illustrated example, the output 118 provided by breakout session mixer 114 and the alert signal 120 are illustrated as separate signals, however, those skilled in the art should readily appreciate that this illustration is merely for ease of illustration as in particular embodiments, the output signal 118 and alert signal 120 may be combined (mixed) into a single data stream.

In an example embodiment, the alert signal 120 is provided to all participants of the sub-group meeting. In particular embodiments, the alert signal 120 may be limited to a single participant or a group of participants. For example, if the keyword is a group affiliation associated with a selected subset of participants of the sub-group meeting (such as, for example "Marketing"), the alert signal 120 is sent to members of the selected subset of participants. As another example, if the keyword is the name of a participant of the sub-group meeting, the alert signal 120 is sent to the participant.

Output 116 can be an audio stream, a video stream, or an audiovisual stream. Similarly, output 118 can be an audio stream, a video stream, or an audiovisual stream. In particular embodiments, outputs 116 and 118 may also provide streaming text. In an example embodiment, output 118 comprises the output 116 being provided to the main meeting participants. In particular embodiments, the audio portion of the stream being provided to the main meeting participants is provided at a lower volume than the first stream to participants of the sub-group meeting.

Figure 2:
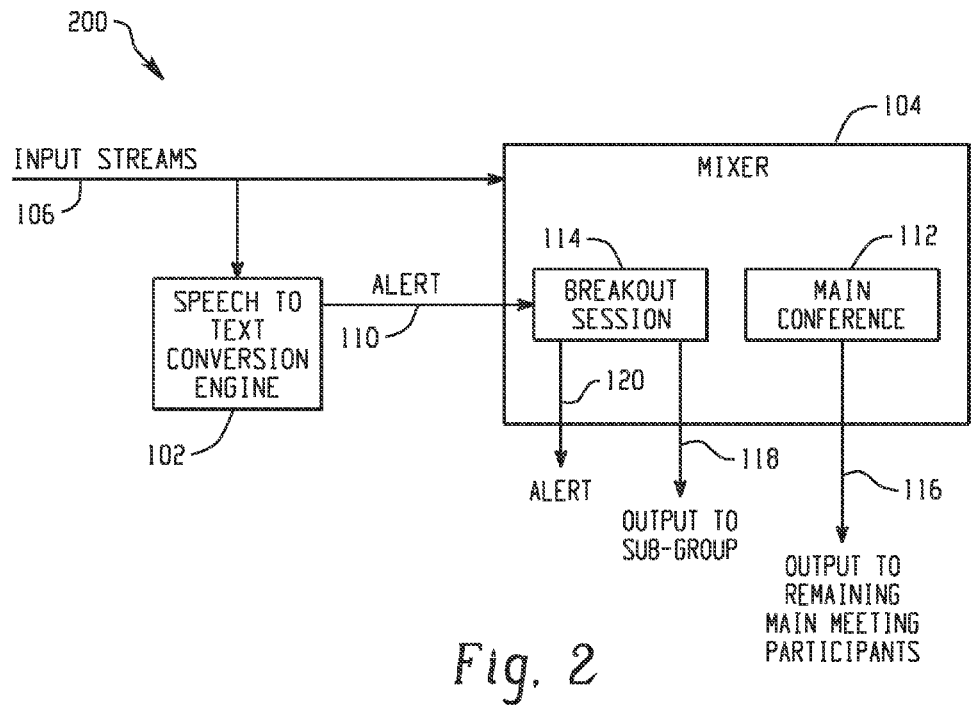
FIG. 2 is a block diagram of a conferencing system that employs a speech to text converter in parallel with a mixer.

FIG. 2 is a block diagram of a conferencing system 200 that employs a speech to text converter 102 in parallel with a mixer 104. In this example, the input streams 106 from meeting participants are provided to both speech to text converter 102 and mixer 104. In the illustrated example, mixer 104 comprises a main conference mixer 112 for mixing signals and provides an output 116 that is provided to the main meeting and a breakout session mixer 114 for mixing signals and provides a signal 118 that is provided to participants of the breakout session.

If the speech to text converter 102 detects that a meeting participant uttered a predefined keyword in an input stream, the speech to text converter 102 generates an alert 110. In particular embodiments, the speech to text converter 102 searches input streams from participants in the main conference meeting for keywords. In an example embodiment, the alert 110 is provided to the breakout session mixer 114. Breakout session mixer 114 transmits an alert 120 to the appropriate participants of the breakout session. In the illustrated example, the output 118 provided by breakout session mixer 114 and the alert signal 120 are illustrated as separate signals, however, those skilled in the art should readily appreciate that this illustration is merely for ease of illustration as in particular embodiments, the output signal 118 and alert signal 120 may be combined (mixed) into a single data stream.

In an example embodiment, the alert signal 120 is provided to all participants of the sub-group meeting. In particular embodiments, the alert signal 120 may be limited to a single participant or a group of participants. For example, if the keyword is a group affiliation associated with a selected subset of participants of the sub-group meeting (such as, for example "Marketing"), the alert signal 120 is sent to members of the selected subset of participants. As another example, if the keyword is the name of a participant of the sub-group meeting, the alert signal 120 is sent to the participant.

Output 116 can be an audio stream, a video stream, or an audiovisual stream. Similarly, output 118 can be an audio stream, a video stream, or an audiovisual stream. In particular embodiments, outputs 116 and 118 may also provide streaming text. In an example embodiment, output 118 comprises the output 116 being provided to the main meeting participants. In particular embodiments, the audio portion of the stream being provided to the main meeting participants is provided at a lower volume than the first stream to participants of the sub-group meeting.

Figure 3:
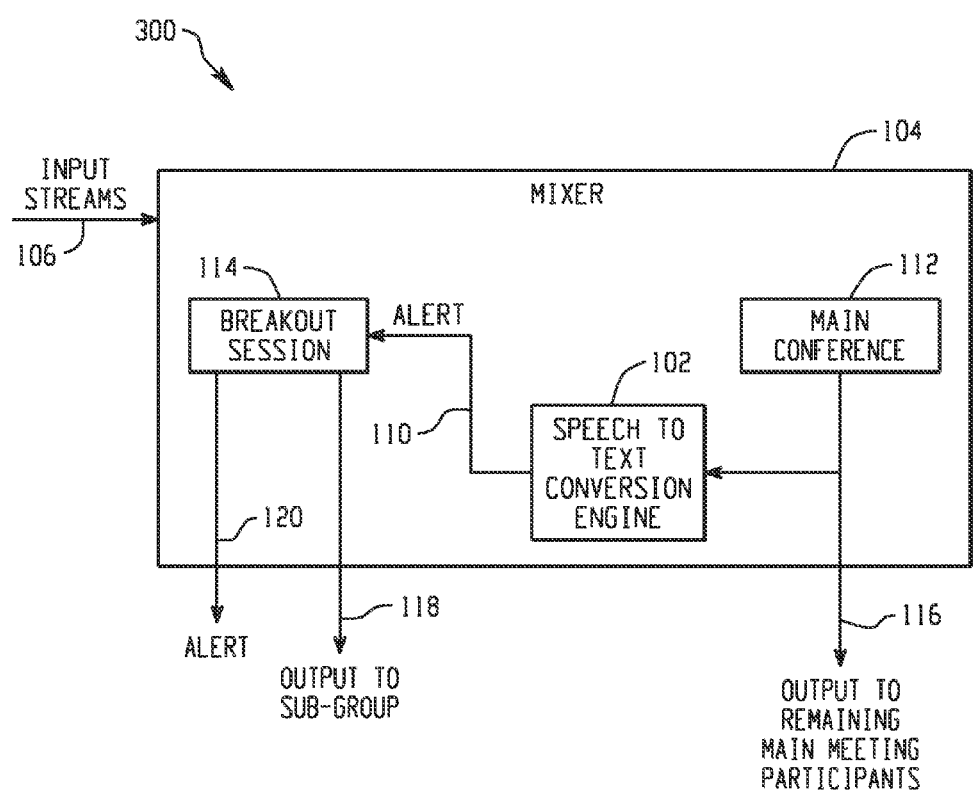
FIG. 3 is a block diagram of a conferencing system that employs a speech to text converter that is coupled with the output of the mixer for the main meeting, the speech to text converter provides a notification to participants of a breakout session when a keyword is detected.

FIG. 3 is a block diagram of a conferencing system 300 that employs a speech to text converter 102 that is coupled with the output of the main conference mixer 112. The speech to text converter 102 provides a notification to participants of a breakout session when a keyword is detected. In this embodiment, input streams 106 are provided to mixer 104 which distributes the appropriate streams to main conference mixer 112 and breakout session mixer 114. Speech to text converter 102 is coupled with the output of main conference mixer 112 and upon detecting a keyword from the output of main conference mixer 112 sends an alert 110 to breakout session mixer 114. Breakout session mixer 114 transmits an alert 120 to the appropriate participants of the breakout session. In the illustrated example, the output 118 provided by breakout session mixer 114 and the alert signal 120 are illustrated as separate signals, however, those skilled in the art should readily appreciate that this illustration is merely for ease of illustration as in particular embodiments, the output signal 118 and alert signal 120 may be combined (mixed) into a single data stream.

In an example embodiment, the alert signal 120 is provided to all participants of the sub-group meeting. In particular embodiments, the alert signal 120 may be limited to a single participant or a group of participants. For example, if the keyword is a group affiliation associated with a selected subset of participants of the sub-group meeting (such as, for example "Marketing"), the alert signal 120 is sent to members of the selected subset of participants. As another example, if the keyword is the name of a participant of the sub-group meeting, the alert signal 120 is sent to the participant.

Output 116 can be an audio stream, a video stream, or an audiovisual stream. Similarly, output 118 can be an audio stream, a video stream, or an audiovisual stream. In particular embodiments, outputs 116 and 118 may also provide streaming text. In an example embodiment, output 118 comprises the output 116 being provided to the main meeting participants. In particular embodiments, the audio portion of the stream being provided to the main meeting participants is provided at a lower volume than the first stream to participants of the sub-group meeting.

Figure 4:
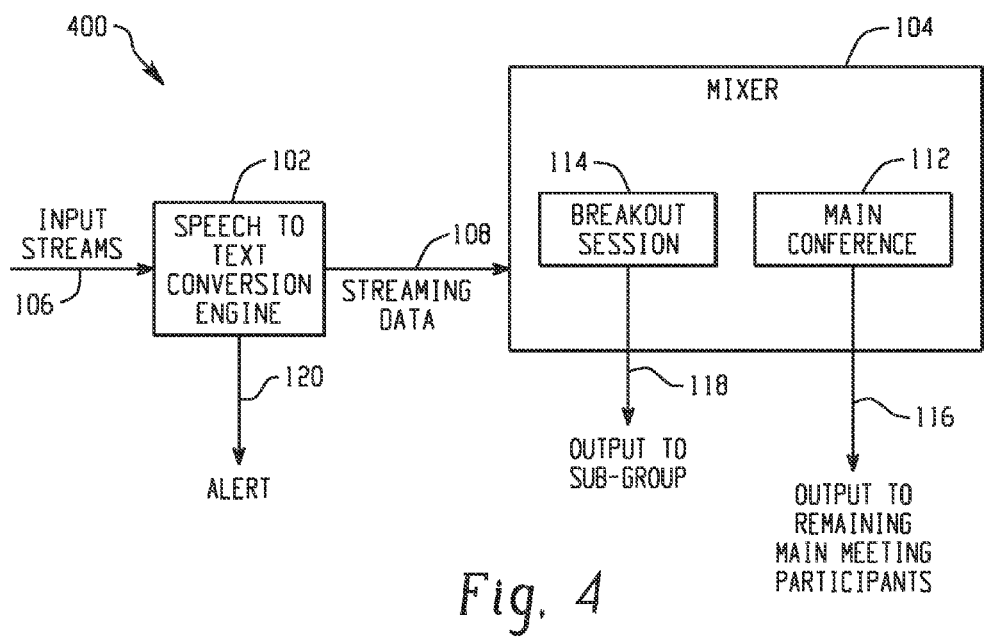
FIG. 4 is a block diagram of a conferencing system that employs a speech to text converter in series with a mixer where the speech to text converter provides a notification to participants of a breakout session when a keyword is detected.

FIG. 4 is a block diagram of a conferencing system 400 that employs a speech to text converter 102 in series with a mixer 104 where the speech to text converter 102 provides an alert (notification) 120 to participants of a breakout session when a keyword is detected.

In an example embodiment, the alert signal 120 is provided to all participants of the sub-group meeting. In particular embodiments, the alert signal 120 may be limited to a single participant or a group of participants. For example, if the keyword is a group affiliation associated with a selected subset of participants of the sub-group meeting (such as, for example "Marketing"), the alert signal 120 is sent to members of the selected subset of participants. As another example, if the keyword is the name of a participant of the sub-group meeting, the alert signal 120 is sent to the participant.

Output 116 can be an audio stream, a video stream, or an audiovisual stream. Similarly, output 118 can be an audio stream, a video stream, or an audiovisual stream. In particular embodiments, outputs 116 and 118 may also provide streaming text. In an example embodiment, output 118 comprises the output 116 being provided to the main meeting participants. In particular embodiments, the audio portion of the stream being provided to the main meeting participants is provided at a lower volume than the first stream to participants of the sub-group meeting.

Figure 5:
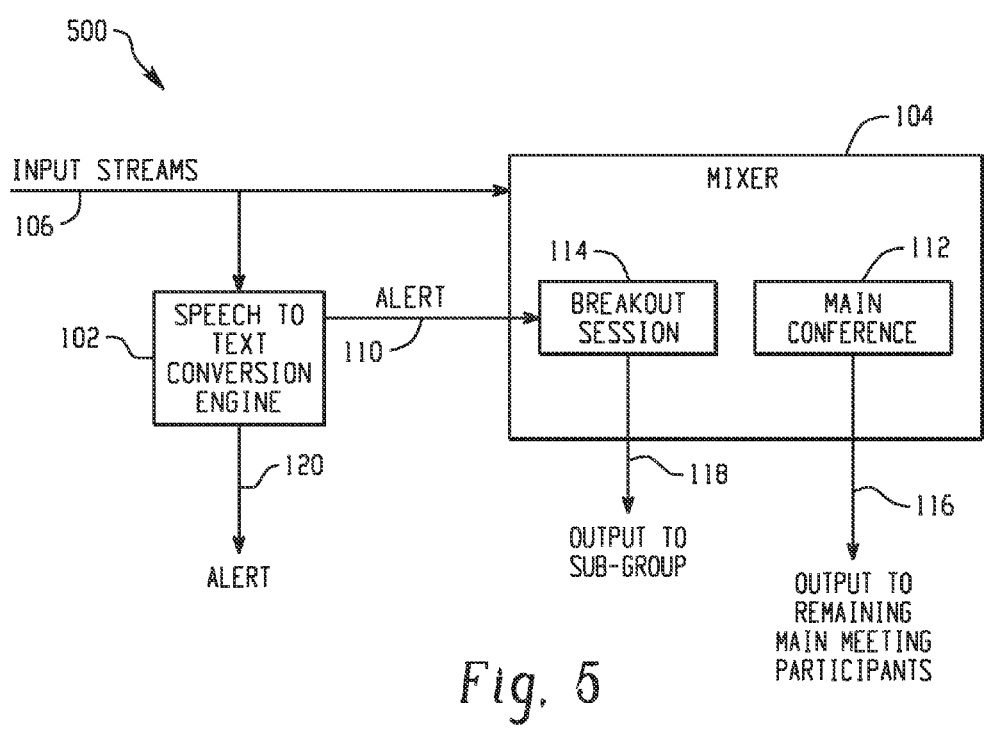
FIG. 5 is a block diagram of a conferencing system that employs a speech to text converter in parallel with a mixer where the speech to text converter provides a notification to participants of a breakout session when a keyword is detected.

FIG. 5 is a block diagram of a conferencing system 500 that employs a speech to text converter 102 in parallel with a mixer 104 where the speech to text converter 102 provides an alert (notification) 120 to participants of a breakout session when a keyword is detected. In this example, the input streams 106 from meeting participants are provided to both speech to text converter 102 and mixer 104. In the illustrated example, mixer 104 comprises a main conference mixer 112 for mixing signals and provides an output 116 that is provided to the main meeting and a breakout session mixer 114 for mixing signals and provides a signal 118 that is provided to participants of the breakout session.

If the speech to text converter 102 detects that a meeting participant uttered a predefined keyword in an input stream, the speech to text converter 102 generates an alert 120. In particular embodiments, the speech to text converter 102 searches input streams from participants in the main conference meeting for keywords.

In an example embodiment, the alert signal 120 is provided to all participants of the sub-group meeting. In particular embodiments, the alert signal 120 may be limited to a single participant or a group of participants. For example, if the keyword is a group affiliation associated with a selected subset of participants of the sub-group meeting (such as, for example "Marketing"), the alert signal 120 is sent to members of the selected subset of participants. As another example, if the keyword is the name of a participant of the sub-group meeting, the alert signal 120 is sent to the participant.

Output 116 can be an audio stream, a video stream, or an audiovisual stream. Similarly, output 118 can be an audio stream, a video stream, or an audiovisual stream. In particular embodiments, outputs 116 and 118 may also provide streaming text. In an example embodiment, output 118 comprises the output 116 being provided to the main meeting participants. In particular embodiments, the audio portion of the stream being provided to the main meeting participants is provided at a lower volume than the first stream to participants of the sub-group meeting.

Figure 6:
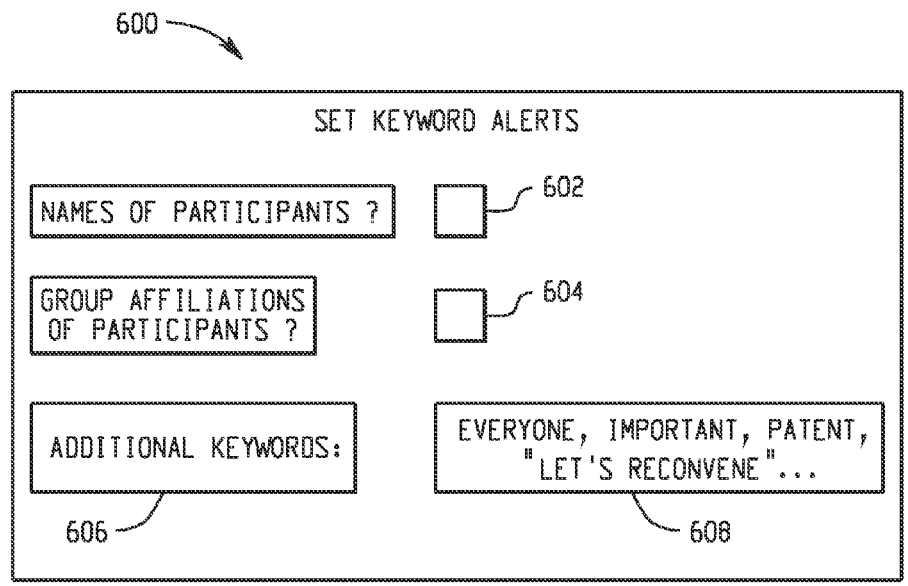
FIG. 6 illustrates an example of a user interface for specifying keywords for triggering a notification to participants of a breakout session.

FIG. 6 illustrates an example of a user interface 600 for specifying keywords for triggering a notification to participants of a breakout session. In the illustrated example, a checkbox 602 is employed for allowing the person configuring the keywords to specify whether the keyword search list should include the names of participants in the breakout session. Another checkbox 604 is employed for allowing the person configuring the keywords to specify whether group affiliations (such as department) should be included in the keywords list. An entry block 606 is provided for allowing the person configuring the keywords to type in keywords to add to the list of keywords to be searched. A display box 608 is provided to show previously configured keywords.

In an example embodiment, the person configuring the keywords can select words from display box 608 to edit and/or delete. In particular embodiments, certain predefined keywords can be pre-configured.

Figure 7:
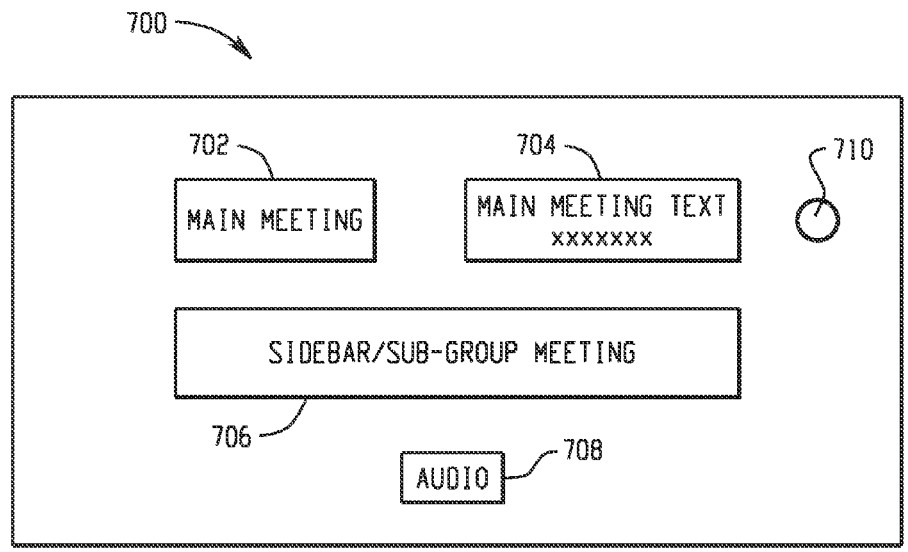
FIG. 7 illustrates an example user interface for a participant of a breakout session of a conference call.

FIG. 7 illustrates an example user interface 700 for a participant of a breakout session of a conference call. Note that not all of the illustrated features may be included in some example embodiments.

The user interface 700 comprises a main meeting display 702. In particular embodiments, text from the main meeting may be provided in text display area 704. In an example embodiment, predefined keywords detected from the main meeting may be highlighted (e.g., in a larger and/or bold font) in text display area 704 to alert participants of the breakout session when a keyword is uttered, and if sufficient display area is available, allow the participants to determine the context, for example by reviewing the sentence the keyword appeared in.

The video portion of the breakout session is provided in breakout display 706. Audio is provided by audio output 708. The audio output 708 may also include audio from the main meeting. In an example embodiment, the audio from the main meeting is output at a lower volume than the audio for the breakout session.

In an example embodiment, an alert indicator 710 may also be provided. For example, the alert indicator 710 may flash or display a certain color (e.g., red) when a keyword is detected. In another example embodiment, the background of the main meeting video 702 may flash or change colors to provide a visual alert when a keyword is detected.

Figure 8:
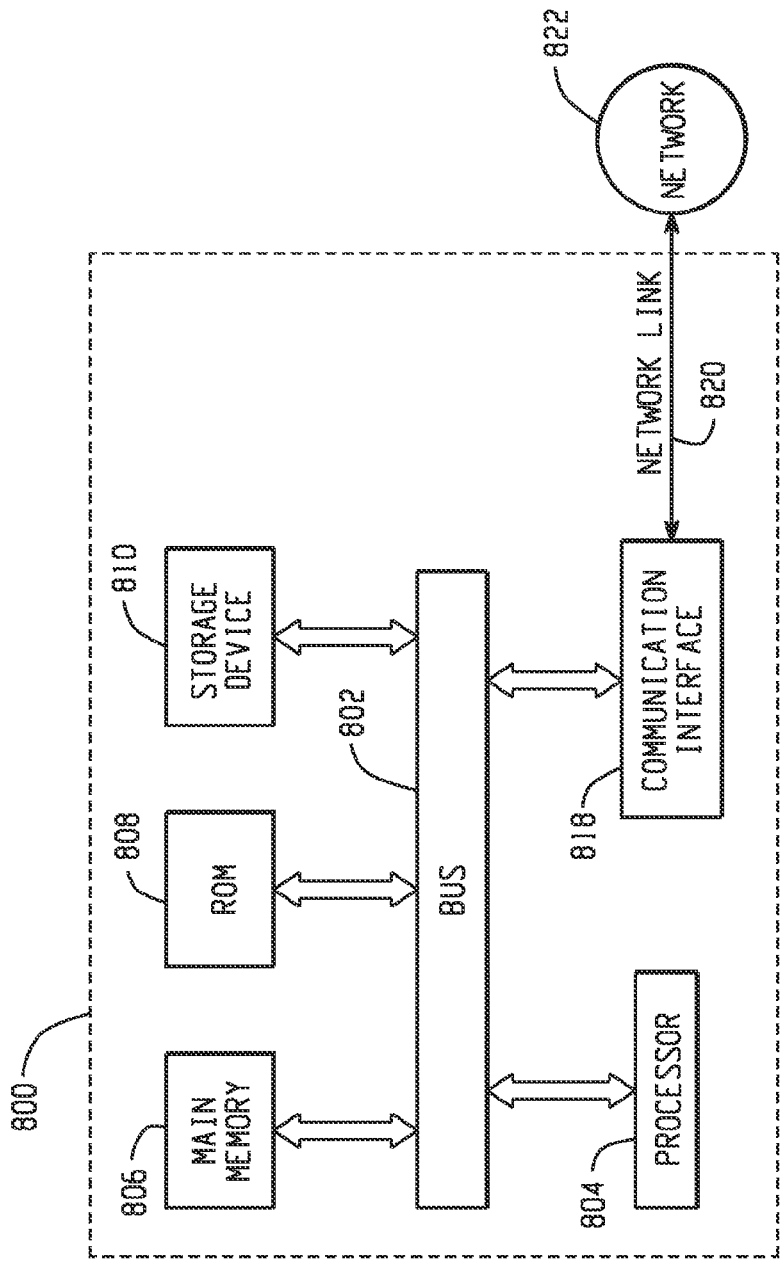
FIG. 8 is a block diagram that illustrates a computer system upon which an example embodiment may be implemented.

FIG. 8 is a block diagram that illustrates a computer system 800 upon which an example embodiment may be implemented. Computer system 800 may be employed to implement the functionality of apparatus 100 (FIG. 1), apparatus 200 (FIG. 2), apparatus 300 (FIG. 3), apparatus 400 (FIG. 4), and/or apparatus 500 (FIG. 5).

Computer system 800 includes a bus 802 or other communication mechanism for communicating information and a processor 804 coupled with bus 802 for processing information. Computer system 800 also includes a main memory 806, such as random access memory (RAM) or other dynamic storage device 810 coupled to bus 802 for storing information and instructions to be executed by processor 804. Main memory 806 also may be used for storing a temporary variable or other intermediate information during execution of instructions to be executed by processor 804. Computer system 800 further includes a read only memory (ROM) 808 or other static storage device 810 coupled to bus 802 for storing static information and instructions for processor 804. A storage device 810, such as a magnetic disk, optical disk, and/or flash storage, is provided and coupled to bus 802 for storing information and instructions.

An aspect of the example embodiment is related to the use of computer system 800 for monitoring a conference call and notifying participants in a breakout session. According to an example embodiment, monitoring a conference call and notifying participants of a breakout session is provided by computer system 800 in response to processor 804 executing one or more sequences of one or more instructions contained in main memory 806. Such instructions may be read into main memory 806 from another computer-readable medium, such as storage device 810. Execution of the sequence of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 804 for execution. Such a medium may take many forms, including but not limited to non-volatile media, and volatile media. Non-volatile media include, for example, optical or magnetic disks, such as storage device 810. Volatile media include dynamic memory such as main memory 806. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 800 also includes a communication interface 818 coupled to bus 802. Communication interface 818 provides a two-way data communication coupling computer system 800 to a communication link 820 that is connected to a network 822.

For example, communication interface 818 may be a local area network (LAN) card to provide a data communication connection to a compatible LAN. As another example, communication interface 818 may be an integrated services digital network (ISDN) card or a modem to provide a data communication connection to a corresponding type of telephone line. Wireless links may also be implemented. In any such implementation, communication interface 818 sends and receives electrical, electromagnetic, or optical signals that carry digital data streams representing various types of information.

In an example embodiment, communication interface 818 allows computer system 800 to receive streaming data, such as audio, visual, or audiovisual from a plurality of meeting participants. Computer system 800 may mix the signals and provide them to meeting participants via communication interface 818. In an example embodiment, the meeting participants comprise a main meeting and at least one breakout session or sub-group meeting. Computer system 800 searches for predefined keywords in streams from/to meeting participants attending the main meeting, and upon encountering one of the predefined keywords in a stream, sends a notification to one or more participants of the breakout session via communication interface 818 in accordance with the example embodiments described herein.

Figure 9:
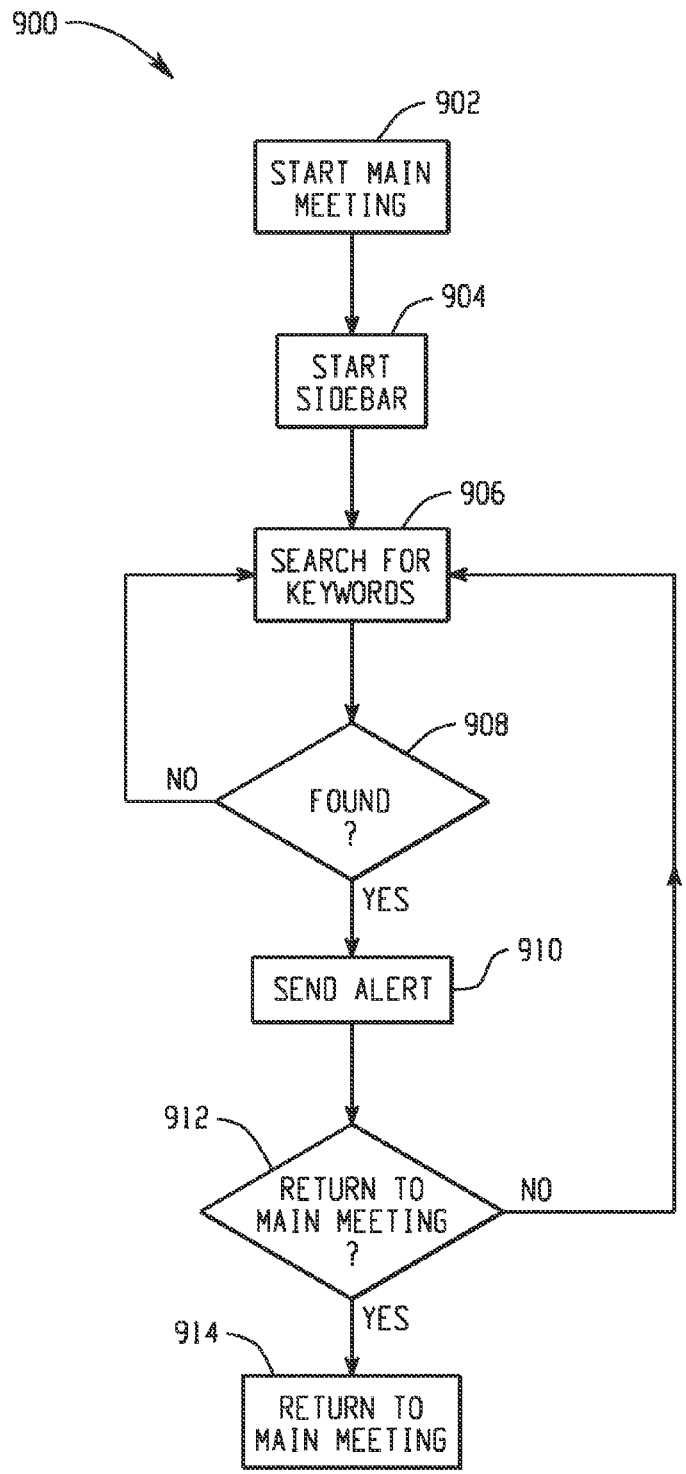
FIG. 9 is an example of a methodology for monitoring a conference call and providing a notification to participants in a breakout session.

In view of the foregoing structural and functional features described above, a methodology 900 in accordance with an example embodiment will be better appreciated with reference to FIG. 9. While, for purposes of simplicity of explanation, the methodology 900 of FIG. 9 is shown and described as executing serially, it is to be understood and appreciated that the methodology 900 is not limited by the illustrated order, as some aspects could occur in different orders and/or concurrently with other aspects from that shown and described herein. Moreover, not all illustrated features may be required to implement a methodology in accordance with an aspect of an example embodiment. The methodology described herein is suitably adapted to be implemented in hardware, software, or a combination thereof. For example, methodology 900 may be implemented by apparatus 100 (FIG. 1), apparatus 200 (FIG. 2), apparatus 300 (FIG. 3), apparatus 400 (FIG. 4), apparatus 500 (FIG. 5) and/or computer system 800 (FIG. 8).

At 902, a main conference (or meeting) starts. The conference may include audio and/or video, and in particular embodiments may also include streaming text.

At 904, a breakout session (or sidebar) is initiated by a sub-group of participants of the main meeting. A separate audio, and in some embodiments video and/or text, stream is provided to members of the breakout session. The audio stream provided to participants may include the audio for the main meeting, and in particular embodiments, the audio for the main meeting may be provided at a lower volume than the audio for the breakout session.

At 906, a search is made for keywords. The search may be conducted of audio stream for the main meeting. Any suitable keywords may be employed. For example, predefined words, phrases, group affiliations, names or nicknames of participants may be employed.

At 908, a determination is made whether a keyword was detected (found). If no keywords were detected (NO), the search for keywords continues at 906.

If, at 908, a keyword was detected (YES), at 910 an alert is sent to one or more participants of the breakout session. Any suitable alert may be employed. For example, an audio alert such as a tone, a video alert such as a flashing light or changing background colors on a video display may be employed, or another visual type that may be employed is providing streaming text where keywords are highlighted (for example displayed with a larger and/or bolder font) than the surrounding text.

The alert may be sent to a single participant, a group of participants or all participants of the breakout session. For example, if a particular participant's name was detected, only that participant may be notified. If a group affiliation, such as department or job description, is detected, the alert can be limited to members of the group. Alternatively, all alerts can be sent to all participants of the breakout session.

At 912, a determination is made whether the participant (or participants) of the breakout session decide to leave the breakout session and return to the main meeting. For example, if some participants decide not to return to the main meeting (NO), the search for keywords continues at 906. If all of the participants of the breakout session decide to return to the main meeting (YES), at 914 the participants are returned to the main meeting.

In an example embodiment, if some participants elect to remain in the breakout session while other participants elect to return to the main meeting, the participants remaining in the meeting may be informed of which participants left the breakout session and returned to the main meeting. Keyword searches and alerts will no longer be provided for those participants electing to return to the main meeting. However, keyword searches and alerts will continue to be provided to participants who remain in the breakout session.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a mixer for mixing input streams received from participants of a conference call and distributing mixed streams to the participants, the mixer provides a first stream at a first volume to participants of the conference call having a sub-group meeting and provides a second stream at a second volume that is lower than the first volume to remaining participants of the conference call;
a speech to text converter operatively coupled with the mixer;
the speech to text converter is operable to detect whether a remaining participant of the conference call uttered a predefined keyword; and
the speech to text converter is operable to issue an alert to a participant in the sub-group meeting responsive to detecting the predefined keyword,
wherein the predefined keyword detected in the second stream is played as the alert at a third volume that is higher than the second volume.

2. The apparatus set forth in claim 1, wherein the alert is issued to all participants of the sub-group meeting.

3. The apparatus set forth in claim 1, wherein the keyword is a group affiliation associated with a selected subset of participants of the sub-group meeting; and
wherein the alert is sent to members of the selected subset of participants.

4. The apparatus set forth in claim 1, wherein the keyword is a name of a selected participant of the sub-group meeting; and
wherein the alert is sent to the selected participant.

5. The apparatus set forth in claim 1, wherein the speech to text converter is coupled in series with the mixer.

6. The apparatus set forth in claim 1, wherein the speech to text converter is coupled in parallel with the mixer.

7. The apparatus set forth in claim 1, wherein the first stream is selected from a group consisting of an audio stream, a video stream, and an audiovisual stream.

8. The apparatus set forth in claim 7, wherein the second stream is selected from a group consisting of an audio stream, a video stream, and an audiovisual stream.

9. The apparatus set forth in claim 1, wherein the second stream comprises the first stream.

10. Logic encoded in a non-transitory tangible computer readable medium for execution by a processor, and when executed operable to:
mix input streams received from participants of a conference call and distribute mixed streams to the participants, a first stream is provided at a first volume to participants of the conference call having a sub-group meeting and a second stream is provided at a second volume to remaining participants of the conference call;
search selected input streams for a predefined keyword; and
issue an alert to at least one participant in the sub-group meeting responsive to detecting the predefined keyword, wherein the predefined keyword detected in the second stream is played as the alert at a third volume that is higher than the second volume.

11. The logic set forth in claim 10, wherein the alert is sent to all participants in the sub-group meeting.

12. The logic set forth in claim 10, wherein the predefined keyword is a group affiliation associated with a selected subset of participants of the sub-group meeting; and
wherein the alert is sent to members of the selected subset of participants responsive to detecting the group affiliation.

13. The logic set forth in claim 10, wherein the predefined keyword is a name of a selected participant of the sub-group meeting; and
wherein the alert is sent to the selected participant.

14. The logic set forth in claim 10, wherein the first stream is selected from a group consisting of an audio stream, a video stream, and an audiovisual stream.

15. The logic set forth in claim 14, wherein the second stream is selected from a group consisting of an audio stream, a video stream, and an audiovisual stream.

16. The logic set forth in claim 10, wherein the second stream comprises the first stream; and
wherein the second stream is provided at a lower volume than the first stream to participants of the sub-group meeting.

17. A method, comprising:
mixing, by an associated mixer, input streams received from participants of a conference call and distributing mixed streams to the participants, a first stream is provided at a first volume to participants of the conference call having a sub-group meeting and a second stream is provided at a second volume to remaining participants of the conference call;
converting, by an associated speech to text converter, speech from the second stream to text;
searching for a predefined keyword in the text; and
sending an alert to a participant in the sub-group meeting at a third volume that is higher than the second volume responsive to detecting the predefined keyword.

18. The method according to claim 17, wherein the predefined keyword is a group affiliation associated with a selected subset of participants of the sub-group meeting; and
wherein the alert is sent to members of the selected subset.

19. An apparatus, comprising:
a mixer configured to mix input streams received from participants of a conference call and distribute mixed streams to the participants of the conference call, the mixer providing a first stream at a first volume to participants of the conference call having a sub-group meeting and providing a second stream at a second volume that is lower than the first volume to remaining participants of the conference call; and logic operatively coupled with the mixer, the logic detecting whether a participant of the remaining participants of the conference call uttered a predefined keyword, and the logic selectively issuing an alert to a participant in the sub-group meeting responsive to detecting the uttering of the predefined keyword, wherein the alert is played to the participant in the sub-group meeting at a third volume that is higher than the second volume.

20. The apparatus set forth in claim 19, wherein the logic is a speech to text converter operatively coupled with the mixer.

21. The apparatus set forth in claim 19, wherein the predefined keyword detected in the second stream is played as the alert at the third volume.

\* \* \* \* \*